_United States Patent_ [15] 3,680,046
Bergey et al. [45] July 25, 1972

[54] ALERTING SYSTEM

[72] Inventors: John M. K. Bergey, Doylestown; Stephen Kalatucka, Willow Grove, both of Pa.

[73] Assignee: The United States of America as represented by the Secretary of the Navy

[22] Filed: Dec. 18, 1970

[21] Appl. No.: 99,563

[52] U.S. Cl. ..................340/146.2, 340/27 NA, 235/177, 235/151.3
[51] Int. Cl. ........................................G06f 7/02, G06f 7/385
[58] Field of Search............340/146.2, 26, 27 NA; 235/177, 235/150.23, 151.3, 151.32, 61 NV; 73/384, 178 R; 244/77 D; 343/112 A

[56] References Cited

UNITED STATES PATENTS

| | | | |
|---|---|---|---|
| 3,217,293 | 11/1965 | Metz | 340/146.2 |
| 3,355,706 | 11/1967 | Pitches | 340/27 R |
| 3,273,122 | 9/1966 | Chandler | 340/146.2 |
| 3,538,316 | 11/1970 | Barrett et al. | 340/146.2 X |
| 3,237,159 | 2/1966 | Emmons | 340/146.2 |

Primary Examiner—Malcolm A. Morrison
Assistant Examiner—James F. Gottman
Attorney—R. S. Sciascia, Henry Hansen and Gilbert H. Hennessey

[57] ABSTRACT

An aircraft cockpit display system for indicating whether the aircraft is above, below, within or adjacent to a preset altitude corridor. The binary coded decimal output of an altitude reporting encoder is combined with a signal indicative of the assigned altitude preselected by thumbwheel switches. The computed deviation from the command altitude is compared to a similarly selected deviation setting. A deviation detection logic unit provides output signals to shape-coded, lightable indicators advising the pilot to descend or climb to the flight corridor, if necessary. A proximity detection logic unit receives signals from the deviation detection logic unit and an adjustable proximity range selector indicative of proximity zones above and below the flight corridor to drive an indicator and audio beeper to alert the pilot of approaches to and departures from the flight corridor.

12 Claims, 5 Drawing Figures

INVENTORS
JOHN M.K. BERGEY
STEPHEN KALATUCKA
BY
ATTORNEYS

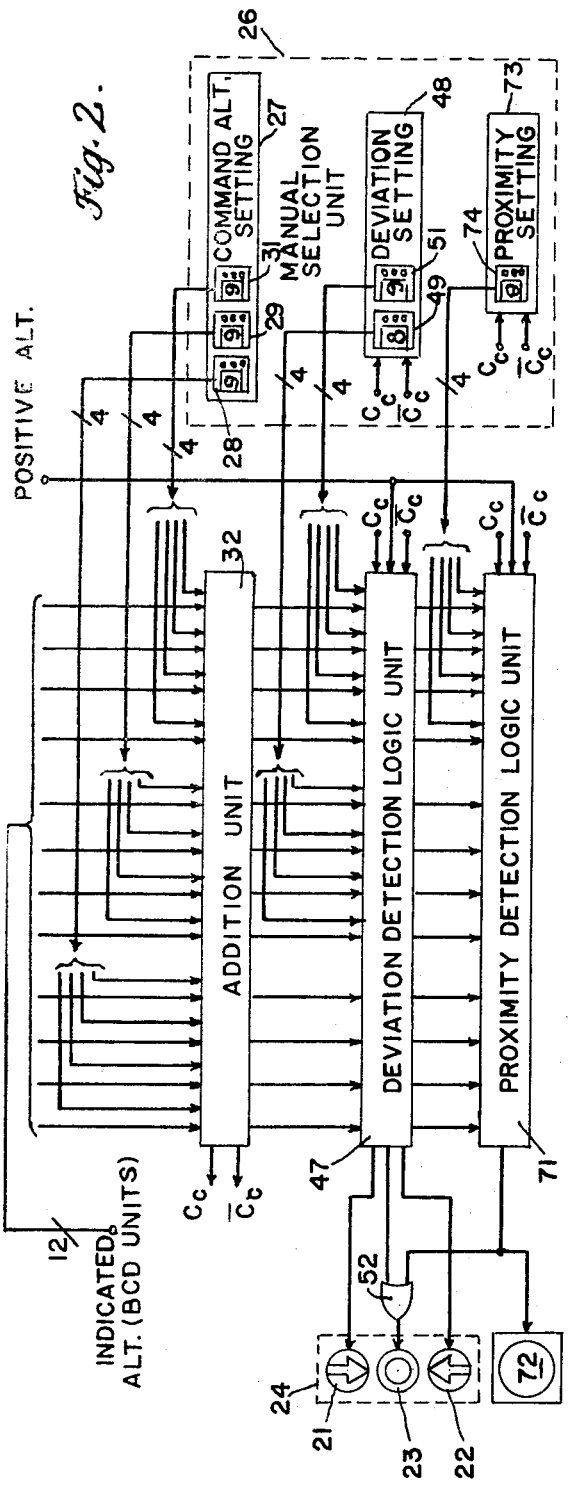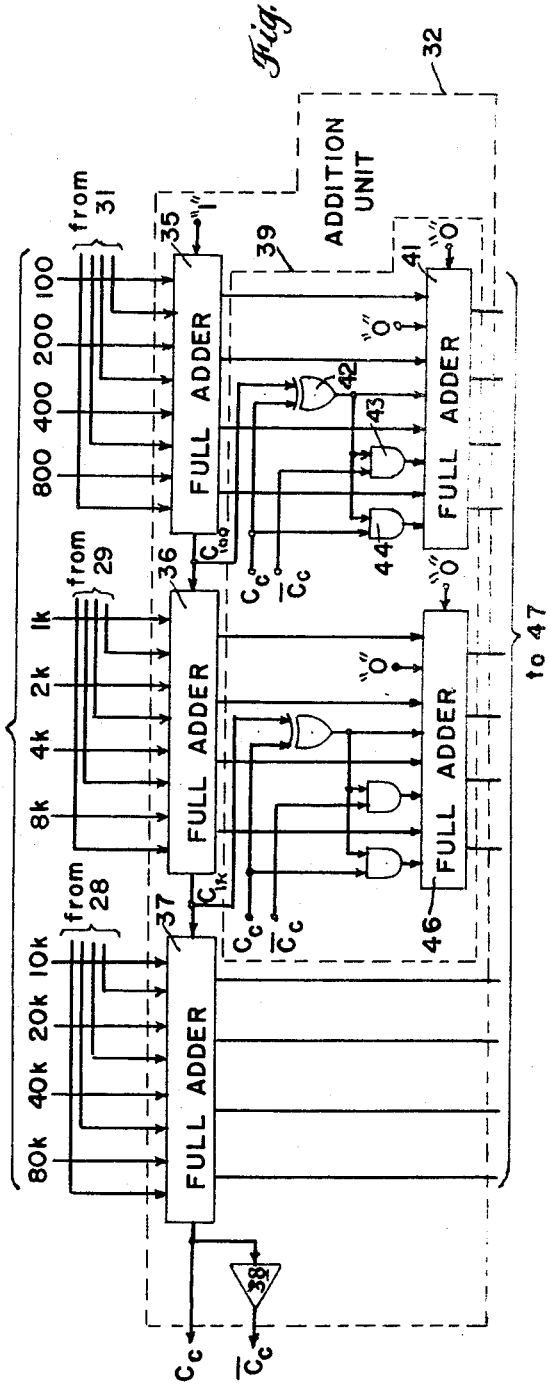

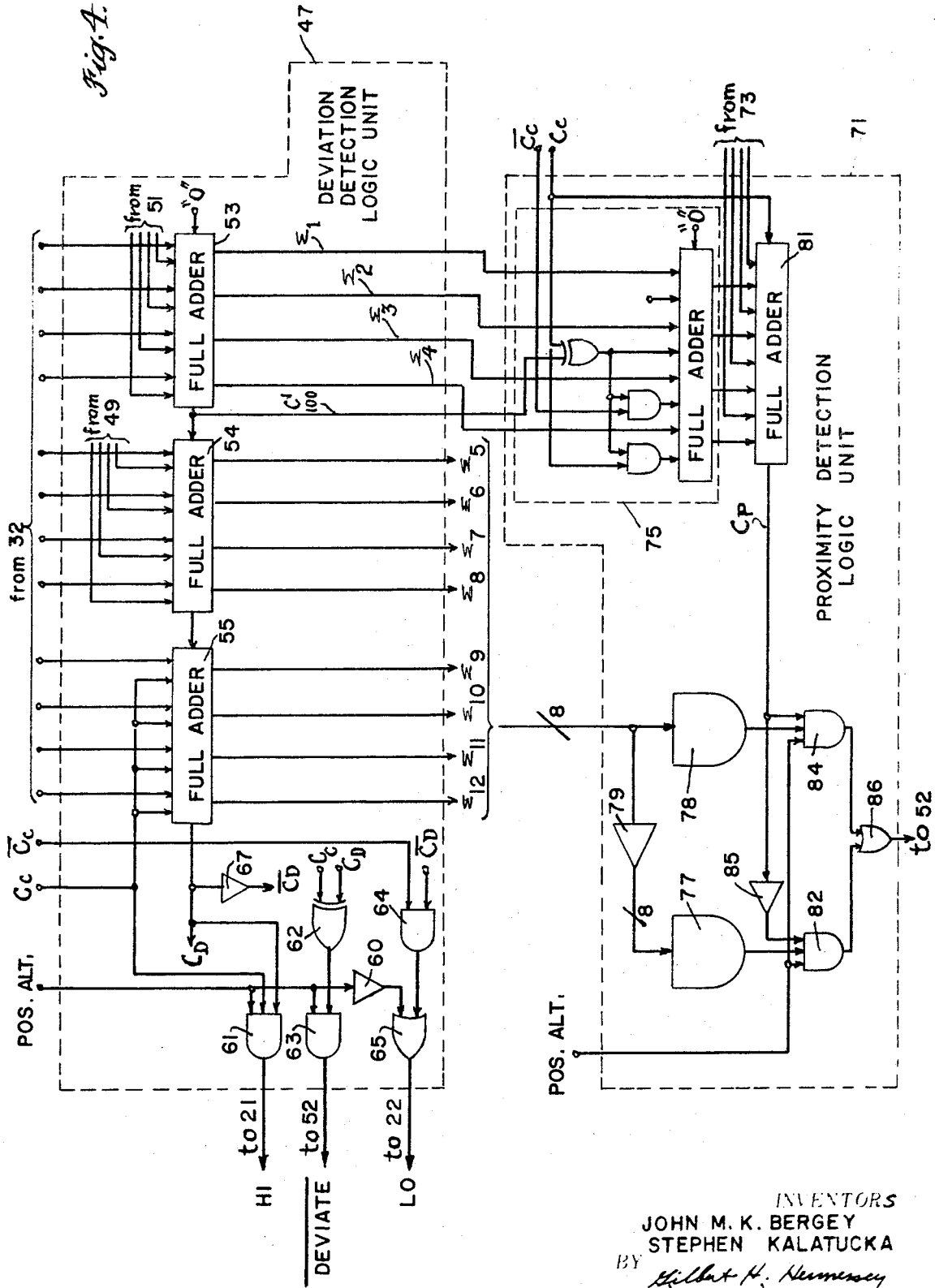

ALERTING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the fields of altimetry and digital comparators, and more particularly to improved logic systems for alerting a pilot of his position relative to a plurality of selected altitude corridors.

Due to the hazards of increased air traffic, there is substantial agreement in the aviation community that altitude awareness must be increased. Pilots often are not immediately aware of dangerous deviations from assigned altitudes. Previous analog systems employing synchro pickoffs from an altitude responsive member were not easily adjustable, required periodic adjustments and interfered with the altimeter reading to some degree. In many prior art devices the center altitude of the flight corridor could be manually set, but the width of the corridor was not adjustable. Nor was the pilot automatically notified of approach to and departure from the corridor.

SUMMARY OF THE INVENTION

Accordingly, one of the objects of the invention is to increase altitude awareness by advising the pilot of approaches and deviations from a preselected altitude. Another object of the invention is to improve the versatility and accuracy of altitude alerting systems by enabling simple manual selection of flight corridor parameters such as assigned altitude and permissible deviations. A further object of the invention is to use the digital outputs of an altitude reporting encoder to derive information relative to settable reference altitudes. Still another object of the invention is to display information relating to assigned altitudes in a compact, easily readable form.

These and other objects of the invention are achieved by providing a set of shape-coded indicators operated by a digital logic system which automatically decides whether an aircraft is above, below, within or adjacent to a selected altitude corridor. A logic unit combines the indicated altitude in binary coded decimal form from an altitude reporting encoder with a thumbwheel selected command or assigned altitude to generate a digital altitude error signal which is compared in a deviation detection logic unit to a selected deviation range. The output of the deviation detection logic unit drives shape-coded, lightable indicators advising the pilot to descend or climb to the assigned corridor, if necessary. A proximity detection logic unit compares the output of the deviation detection logic unit with a selected proximity range indicative of proximity zones or approach corridors above and below the flight corridor to alert the pilot of approaches to and departures from the flight corridor.

BRIEF DESCRIPTION OF THE DRAWINGS

FIG. 2 is a block diagram of the logic circuitry associated with the display of FIG. 1;

FIG. 3 is a block diagram of an embodiment of the addition unit of FIG. 2;

FIG. 4 is a block diagram of an embodiment of the deviation and proximity detection logic units of FIG. 2.

DESCRIPTION OF THE PREFERRED EMBODIMENTS

Figure 1:
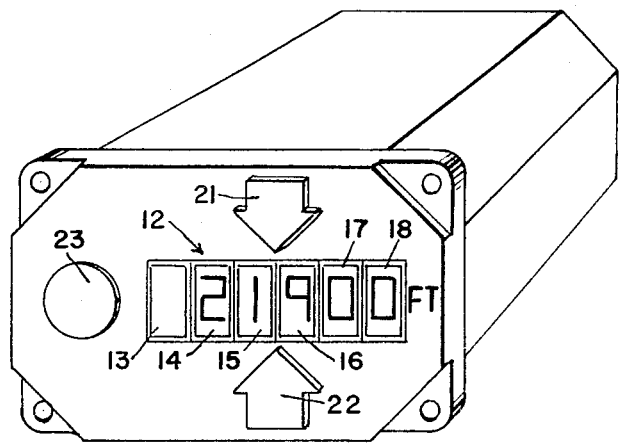
FIG. 1 is a perspective view of an embodiment of the altitude advising and alerting display according to the invention.

An altitude advising and alerting display module designed to be mounted on an aircraft instrument panel is depicted in FIG. 1 to illustrate the general appearance of the display according to the invention. A digital altitude display 12 is composed of six elements driven by a suitable altimeter and digital encoder such as that described in the copending U.S. Pat. Application Ser. No. 625,921 filed Mar. 22, 1967 for "Readout Device for Altitude Reporting Encoder" by John M. K. Bergey now U.S. Pat. No. 3,560,959 issued Feb. 2, 1971. In accordance therewith the first element 13 is a minus sign, termed negative altitude discrete, which may be activated by the encoder system to display barometrically uncompensated altitudes indicated to be below sea level. The next three elements 14, 15 and 16 are seven segment decimal displays for the 10,000s, 1,000s and 100s digits respectively. The last two elements 17 and 18 are dummy zeros for the 10s and ones digits, resolution being limited to one hundred foot increments. The altitude alerting display comprises three shape-coded, lightable indicators arranged about altitude display 12. A descent indicator 21 in the form of a large downward arrow is located directly above the center of display 12. Likewise, an arrow-shaped ascent indicator 22 is located opposite indicator 21 below display 12. Directly to the left of display 12, there is a confirm or "bull's-eye" indicator 23.

Referring now to FIG. 2, the logic system operating indicators 21, 22 and 23 of the altitude alerting display 24 employs inputs from two sources. One group of inputs is from a manual selection unit 26 comprising three thumbwheel setting units for adjusting various parameters of the flight corridors. The other group of inputs represents the indicated altitude in binary coded decimal (BCD) units received from a suitable altimeter encoder such as that shown in the above-mentioned copending application. By analyzing these two groups of inputs, the logic system determines which indicators in display 24 should be activated.

A command altitude setting unit 27 comprising three thumbwheel switches 28, 29 and 31 is used to set in the assigned or command altitude. All of the thumbwheel switches described herein are mechanically similar and comprise a manually rotatable wheel with a gear driven display of the appropriate decimal digit 0 through 9 and an encoder to convert the decimal to a four-digit natural binary number. Many suitable types of commercial thumbwheel encoders are available. For example, by contacting a series of conductive strips arranged in four concentric circular tracks on a disc rotatable with the thumbwheel, four corresponding electrical pickoffs could sense the appropriate binary status of the strip for any given location on a particular track. The binary output thus consists of four parallel lines and represents the regular or inverted binary digits depending on the signal levels employed. For command altitude setting unit 27 thumbwheel switches 28, 29 and 31 represent respectively the 10,000 feet, 1,000 feet and 100 feet digit in the assigned altitude.

Referring now to FIG. 3 addition unit 32 is implemented to generate the difference between the indicated altitude and the command altitude in two's complement BCD form by adding the indicated altitude and the two's complement of the command altitude established by setting unit 27. Each BCD unit forming the indicated output is passed to a respective four bit binary full adder. In particular, the 100 feet unit comprising four binary digits of the indicated altitude is passed to a full adder 35. In FIG. 3 these inputs are given the conventional notation 800, 400, 200 and 100 respectively representing the decimal equivalent of the binary value. The 1,000 feet unit of the indicated altitude is passed to a second full adder 36, and the 10,000 feet unit of the indicated altitude is similarly fed to a third full adder 37. The corresponding units from thumbwheel switches 28, 29 and 31 in setting unit 27 are likewise fed to full adders 35, 36 and 37 so that corresponding units of the indicated altitude and selected command altitude may be summed. The outputs from thumbwheel switches 28, 29 and 31 are inverted by choice of signal level thus providing the one's complement of the command altitude in BCD form. To yield the two's complement of the command altitude, however, a binary one is hard-wired to the least significant carry input in full adder 35. The two's complement of the command altitude is thus automatically provided for summing with the indicated altitude. It is well known that the sum of a first binary number and a second binary number in two's complement binary form yields a binary number also in two's complement form equal to the difference between the first and second numbers and the proper sign of that difference. Adders 35, 36 and 37 could be thought of as a regular 12-bit full adder but for the fact that the BCD form instead of straight natural binary is being used. These adders do, however, operate in the conventional manner with carry over from one sum bit to the more significant bit. The final adder 37 has a most significant carry output $C_c$, meaning command carry, which indicates the sign of the difference between the indicated and command altitudes. When $C_c$ is a "one," the indicated altitude is greater than or equal to the command altitude. Otherwise the command altitude is greater than the indicated altitude. An inverter 38 provides the complement of $C_c$, $\overline{C_c}$, useful in the remainder of the circuit.

To yield a valid BCD code the generated sum must be operated on by a correction circuit 39. The sum outputs from full adder 35 are passed to another full adder 41 where each of the 4 bits from adder 35 is summed with an appropriate correction digit. The least significant bit from adder 35 is summed with a hard-wired binary zero. The most significant carry from adder 35 is passed along with the command carry, $C_c$, to an exclusive OR gate 42 whose output is passed to adder 41 to be summed with the second bit of adder 35. The complement of the command carry, $\overline{C_c}$, is passed along with the output of exclusive OR gate 42 to AND gate 43 whose output is summed with the third bit of adder 35. $C_c$ and the output of exclusive OR gate 42 are ANDed in gate 44 whose output is summed with the most significant sum bit of adder 35. It should be noted that adder 41 has a hard-wired binary "zero" input to its least significant carry stage. The sum output of adder 36 is similarly corrected by another full adder 46. The manner in which the bits are summed in the adder 46 is exactly the same as in adder 41.

Addition unit 32 thus provides two groups of outputs: one group related to the sign of the difference indicated by $C_c$ and its complement and the other group representative of the difference between the indicated and command altitudes. This latter output is in valid BCD two's complement form and comprises twelve lines divided into three groups of four representing the 10,000 feet, 1,000 feet and 100 feet unit.

The output of addition unit 32 is passed to a deviation detection logic unit 47 (FIG. 2) and combined with the corresponding outputs of a deviation setting unit 48 in selection unit 26. The deviation setting is defined as the permissible vertical deviation from the command altitude and thus establishes the height of the flight corridor. Two thumbwheel switches 49 and 51 are used to set in the desired 1,000 feet and 100 feet digit for the deviation setting. Deviation settings up to 8,900 feet on either side of the command altitude are possible.

The general function of deviation detection logic unit 47 is to determine by comparison with the selected deviation tolerance whether a difference between the indicated and command altitudes places the aircraft above, below, or within the established flight corridor. Thus, one output of unit 47 indicates that the aircraft is too high, activating descend indicator 21. A second output is passed to an OR gate 52 to activate confirm indicator 23. A third output of unit 47 indicates that the aircraft is too low, lighting ascend indicator 22. If the $C_c$ output from addition unit 32 is a binary "0" (indicated less than command altitude), the deviation setting as provided by thumbwheel switches 49 and 51 is added directly in straight BCD form to the sum output of unit 32; on the other hand, if $C_c = 1$, the one's complement of the deviation setting must be used. Normally this requirement would necessitate using a string of "exclusive OR" gates since the required coding (true or complement) of the deviation setting is a function of $C_c$. However, through the unique use of BCD thumbwheel switches having common complementary leads, the coding of the switches is directly, logically controllable via the $C_c$ and the $\overline{C_c}$ signals. For example, a metallic conductive track encoder for the thumbwheel switch could have two sets of conductive strips on each track corresponding respectively to a high and a low signal. The $C_c$ signal would be operatively connected to one set of strips while the $\overline{C_c}$ signal would be operatively connected to the other set of strips. When $C_c$ is "1", $\overline{C_c}$ is "0" and the first set of strips would be high. On the other hand, when $\overline{C_c}$ is "0", $C_c$ is "1" and the other set of strips would be high. As a result, only one set of four leads is provided from each thumbwheel switch and additional logic is unnecessary. The encoder track strips are connected so that when $C_c$ is "1," the true form of the deviation setting is provided and when $C_c$ is "0," the one's complement of the deviation setting is provided.

Referring to FIG. 4, deviation detection logic unit 47 includes three full adders 53, 54 and 55. Adders 53 and 54 sum corresponding units from unit 32 and thumbwheel switches 49 and 51 in the true or complement form as determined by the value of $C_c$. A binary "0" is hard-wired to the least significant carry input of adder 53. Adder 55 sums $C_c$ with each of the four most significant bits in the sum output of unit 32. The most significant carry bit of full adder 55 is designated deviation carry $C_D$. It is used in conjunction with $C_c$ and the positive altitude discrete provided by an altitude reporting encoder to generate HIGH, $\overline{\text{DEVIATE}}$ (i.e., within the flight corridor) and LOW signal outputs. The Boolean equations describing these signals are as follows:

$$\text{HIGH} = C_c \cdot C_D \cdot \text{POSITIVE ALTITUDE}$$

$$\overline{\text{DEVIATE}} = (C_c \oplus C_D) \cdot \text{POSITIVE ALTITUDE, and}$$

$$\text{LOW} = (\overline{C_c} \cdot \overline{C_D}) + \overline{\text{POSITIVE ALTITUDE}}$$

The HIGH, $\overline{\text{DEVIATE}}$, and LOW signals activate descend, confirm and climb indicators 21, 23 and 22, respectively. The above equations are implemented by an AND gate 61 whose inputs are positive altitude discrete, $C_c$ and $C_D$, where $C_D$ is obtained from the carry output of adder 55 and $C_c$ from the carry output of adder 37 in addition unit 32. The output of AND gate 61 is passed to descend indicator 21. To operate the confirm indicator 23, signals $C_c$ and $C_D$ form the inputs to an exclusive OR gate 62 whose output is one of the inputs to an AND gate 63. The other input to AND gate 63 is the positive altitude discrete. The output of gate 63 is passed to OR gate 52 to activate confirm indicator 23. To light ascend indicator 22, an AND gate 64 with inputs $\overline{C_D}$ and $\overline{C_c}$ provides one input to an OR gate 65. The other input is the complement of the positive altitude discrete provided by an inverter 66. $\overline{C_D}$ is provided by an inverter 67 connected to the carry line for $C_D$. The outputs from full adders 53, 54 and 55 are designated $\Sigma_1$ through $\Sigma_{12}$, where $\Sigma_1$ through $\Sigma_4$, $\Sigma_5$ through $\Sigma_8$, and $\Sigma_9$ through $\Sigma_{12}$ correspond to the 100 feet, 1,000 feet, and 10,000 feet units respectively.

Referring briefly again to FIG. 2, a proximity detection logic unit 71 receives the sum output of deviation detection logic unit 47. $C_c$ and $\overline{C_c}$, positive altitude discrete and a logically controlled proximity setting for the 100 feet unit. The output of proximity detection logic unit 71 forms the other input to OR gate 52 whose output actuates confirm indicator 23. The output of logic unit 71 may also be connected to an audio beeper 72 to provide an audible signal of approach to or departure from the flight corridor. A proximity setting unit 73 in selection unit 26 permits the pilot to select the height of adjacent proximity corridors above and below the flight corridor. A thumbwheel switch 74 operates in a manner similar to switches 49 and 51 to provide a BCD output in true or complement form depending on whether $C_c$ is "1" or "0," respectively.

Referring back to FIG. 4, the 100 feet unit sum from adder 53 in deviation detection logic unit 47 designated $\Sigma_1$ through $\Sigma_4$ is first corrected, if necessary, for an invalid BCD code. As in addition unit 32, this is accomplished via gating and a four bit full adder. Correction unit 75 in proximity detection logic unit 71 operates in the same manner as correction unit 39 in addition unit 32 except that correction is only needed for the 100 feet unit. If $C_c = $ "0," $\Sigma_{12}$ through $\Sigma_5$ must all be "1's," while if the indicated altitude is greater than or equal to the command altitude and $C_c = $ "1," $\Sigma_{12}$ through $\Sigma_5$ must all be "0' s." These conditions are checked via two eight input AND gates 77 and 78, the input to gate 77 being inverted via eight inverters symbolized by inverter 79. The logically controlled proximity setting unit 73 output is added in a four bit full adder 81 to the corrected 100 feet unit sum. The least significant carry in of adder 81 is connected to receive $C_r$. The proximity carry, $C_p$, the most significant carry output of adder 81, is monitored along with the eight input AND gate signals to determine if a proximity signal should be generated. The applicable Boolean equation is as follows:

$$\text{PROXIMITY} = (C_p \cdot \Sigma_{12} \cdot \Sigma_{11} \cdot \Sigma_{10} \cdot \Sigma_9 \cdot \Sigma_8 \cdot \Sigma_7 \cdot \Sigma_6 \cdot \Sigma_5) + (\overline{C_p} \cdot \overline{\Sigma}_{12} \cdot \overline{\Sigma}_{11} \cdot \overline{\Sigma}_{10} \cdot \overline{\Sigma}_9 \cdot \overline{\Sigma}_8 \cdot \overline{\Sigma}_7 \cdot \overline{\Sigma}_6 \cdot \overline{\Sigma}_5)$$

The proximity signal, like the $\overline{\text{DEVIATE}}$ signal, is used to activate confirm indicator 23. To complete implementation, a first AND gate 82 receives the positive altitude discrete, the output of AND gate 77 and the complement of $C_p$ provided by an inverter 83. A second AND gate 84 receives the output of AND gate 78, signal $C_p$ and the positive altitude discrete. The outputs of AND gates 82 and 84 are ORed together in gate 86 whose output is passed to OR gate 52 in FIG. 2 activating confirm indicator 23.

Figure 5:
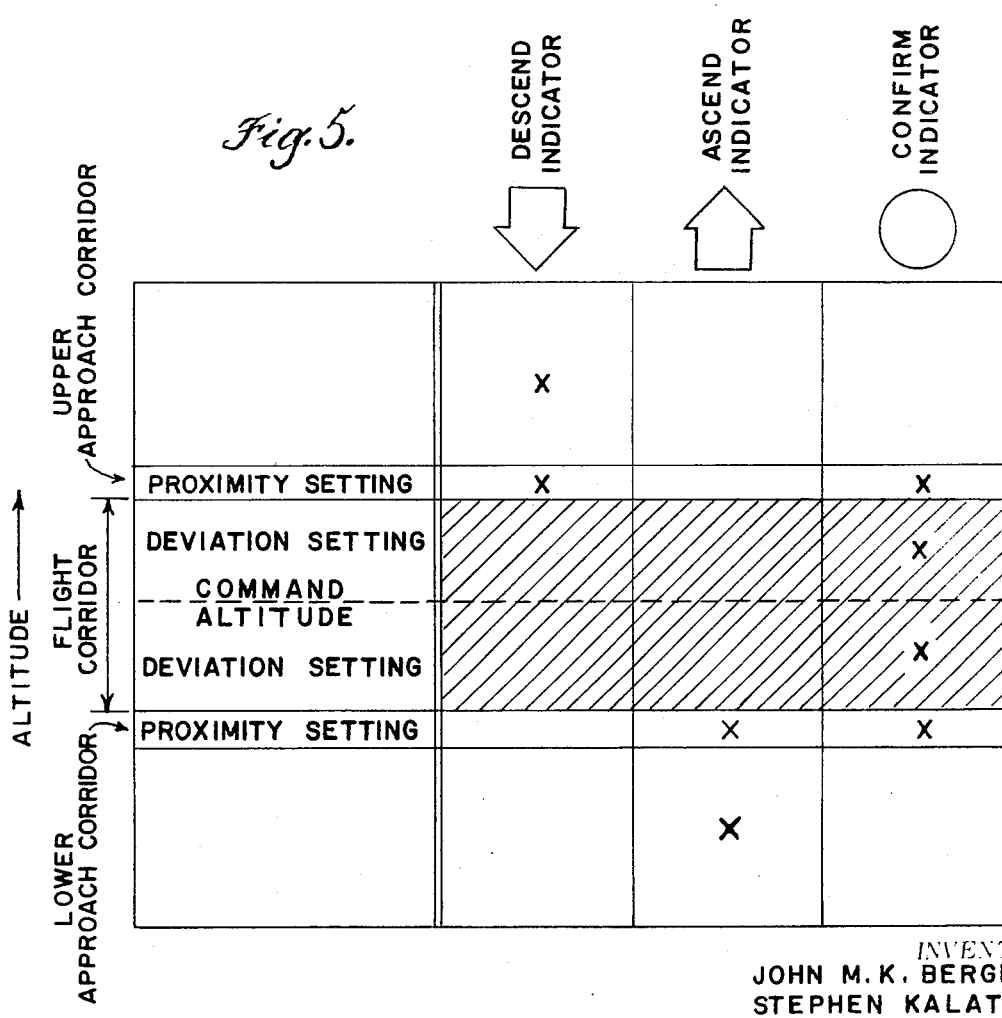
FIG. 5 is a truth table for the display of FIG. 1 additionally showing the vertical arrangement of altitude corridors.

The general operation of the alerting system can best be understood by reference to FIG. 5, a combination truth table and graphical representation of the corridor arrangement. The vertical dimension represents altitude and the shaded portion indicates the desired command flight corridor. Assigned to a specific altitude, the pilot may set in the assigned altitude by rotating the thumbwheel switches in command altitude setting unit 27 to the appropriate numbers. At the same time a tolerance range above and below the command altitude is established by adjusting deviation setting unit 48, thus setting the height of the flight corridor. If the actual (i.e., indicated) aircraft altitude is within this corridor, only confirm indicator 23 is activated. To alert the pilot to approaches and departures from the flight corridor, proximity zones termed approach corridors adjacent to and above and below the flight corridor may be set in by proximity setting unit 73. When the aircraft is within the upper approach corridor, both the descend and confirm indicators are activated. Likewise, if the aircraft is in the lower approach corridor, the ascend and confirm indicators are activated. An audible signal can also be produced by beeper 72 (FIG. 2) while the aircraft is passing through either approach corridor. If the aircraft is above the upper approach corridor, the descend indicator alone is activated; and if it is below the lower approach corridor, only the ascend indicator is lit. If the proximity setting is zero, the three indicator signals are mutually exclusive since confirm indicator 23 is only active when the indicated altitude is in the following range: command altitude minus deviation $\leq$ indicated altitude $\leq$ command altitude plus deviation. If the deviation setting is zero, then the only time confirm indicator 23 alone is energized is when the indicated altitude is exactly equal to the command altitude.

The functioning of the altitude alerting system is deliberately uncomplicated to facilitate quick comprehension by pilots. Yet the logic required to implement these functions is relatively complex due to the fact that there are 900 million independent input combinations associated with the variable indicated altitude and the command altitude, deviation and proximity settings.

In order to understand the operation of the logic implementation, several different typical situations will be described. If the indicated altitude from an altitude reporting encoder is negative only the ascend indicator is activated. This can easily be understood from FIG. 4 in which gates 61, 63, 82 and 84 are all inhibited by a negative altitude reading, that is, a "0" for the positive altitude, while OR gate 65 alone has an output for a negative altitude discrete. Let us assume now that the altitude is positive but well below the flight corridor and lower approach corridor. At this point the indicated altitude would be added to the two's complement of the command altitude as provided by command altitude setting unit 27. If the command carry, $C_r$, is "0" and the most significant carry from full adder 36 (FIG. 3) designated $C_{1K}$ is "0" the associated exclusive OR gate will have no output and the correction logic for the sum output of adder 36 will be effectively inhibited. If on the other hand, $C_{1K}$ is "1," the binary number 0110 will be added to the 1,000 feet sum from adder 36 by the correction circuitry of unit 39 to yield a valid BCD unit. Similarly if the most significant carry, $C_{100}$, for adder 35 is "1" and $C_r$ is "0," the binary number 0110 will be added to the 100 feet sum by the correction circuitry of unit 39. Next the units provided by deviation setting unit 48 are added to the eight least significant bits of the addition unit 32 output, which is still in the two's complement form. The purpose of this operation is to compare the altitude error with the permissible deviation. If at this point the deviation carry, $C_D$, is "1" confirm indicator 23 is lit via exclusive OR gate 62 since we have assumed $C_c$ is "0". On the other hand, if $C_D$ is "0," climb indicator 22 is activated via AND gate 64. Since we are assuming a very low indicated altitude, $C_D$ is "0" and indicator 22 would be activated. The proximity condition would not be satisfied. First, AND gates 77 and 78 (FIG. 4) would test $\Sigma_5$ through $\Sigma_{12}$ to determine whether they were all "1's." If they were not, this in itself would indicate that the proximity zone had not been reached. If they were all "1's," the 100 feet unit sum from adder 53 in logic unit 47 would be checked. If the 100 feet unit carry $C'_{100}$ is "0" the exclusive OR gate in correction unit 75 has no output and no correction takes place. However, if $C'_{100}$ is "1" the binary number 0110 is added to the 100 feet sum for correction to a valid BCD code. At this point the proximity setting from unit 73 is added to the corrected 100 feet sum and the carry for the most significant bit is monitored. If $C_p$, the proximity carry, is "0," AND gate 84 is inhibited, indicating that the lower proximity or approach corridor has not been reached. However, if $C_p$ were "1," AND gate 84 would produce an output to light confirm indicator 23 at the same time as climb indicator 22, thus alerting the pilot of the proximity situation.

Where the indicated altitude is greater than or equal to the command altitude, the command carry, $C_c$, is "1." If, in addition unit 32, the $C_{1K}$ carry from full adder 36 is not "1," the 1,000 feet sum from adder 36 must be corrected by adding the binary number 1010 thereto. Similarly, if the $C_{100}$ carry from adder 35 in unit 32 is not "1," the binary number 1010 must be added to the 100 feet sum by the correction circuitry in unit 39. At this point the one's complement of the deviation setting is added to the eight least significant digits of the sum from addition unit 32 and the binary number 1111 is added to the four most significant sum digits, that is the 10,000 feet digits, from unit 32. If $C_D$ is "0," confirm indicator 23 is lit indicating that the aircraft is within the flight corridor. However, if $C_D$ is "1" the descend indicator is immediately activated via AND gate 61. It should be noted that exclusive OR gate 62 is inhibited by the coincidence of "1's" for $C_c$ and $C_D$. At this point the alerting system must ascertain whether the upper proximity zone has been attained, and $\Sigma_5$ through $\Sigma_{12}$ are checked to see whether they are all zeros. If they are not, then this condition alone indicates that proximity has not been observed. However, if they are all zeros and the 100 feet unit carry $C'_{100}$ is "0," the binary number 1010 is added to the 100 feet sum from adder 53 to yield a valid BCD code. The one's complement of the proximity setting is added to the corrected 100 feet unit sum. The one's complement of the proximity setting is obtained since $\overline{C_c}$ is "1." Next the proximity carry, $C_p$, from the most significant bit of adder 81 in detection logic unit 71 is monitored. If $C_p$ is "0," confirm indicator 23 is activated via gate 82 which is inhibited if $C_p$ is "1."

A sample computation is included to provide an arithmetical representation of the binary manipulations performed by the alerting system logic units. In the example below, command altitude, deviation and proximity settings are 25.5K feet, 0.5K feet and 0.3K feet respectively. The indicated altitude is 24.8K feet, and with respect to the other parameters this would correspond to a position in the lower approach corridor in FIG. 5. The "1" to the right of the one's complement of the command altitude converts it to the two's complement.

the elimination of periodic adjustments formerly required for unreliable analog equipment in which synchro pickoffs were used. The digital system is itself error-free and is limited only by the accuracy of the altimeter with which it is used. The use of thumbwheel switches for the corridor parameters enable quick setting and absolute accuracy in selection.

The real advantages of the system lie in its functional sim-

|  | | 10K Digit | | 1K Digit | | 100 Digit | |
|---|---|---|---|---|---|---|---|
| Indicated altitude (24.8K) | | 0010 | | 0100 | | 1000 | |
| One's complement of the command altitude (25.5K) | | 1101 | | 1010 | | 1010 | 1 |
| Sum (adders 35, 36, 37) | 0 $C_c$ | 1111 | 0 $C_{1K}$ | 1111 | 1 $C_{100}$ | 0011 | |
| 1K sum and 100 sum correction factors | | | | 0000 | | 0110 | |
| Sum (Unit 32) | | 1111 | | 1111 | | 1001 | |
| Deviation setting (0.5K) | | 0000 | | 0000 | | 0101 | |
| $\Sigma_{12}$ throuth $\Sigma_1$ sum (Unit 47) | 0 $C_D$ | 1111 | 0 | 1111 | 0 $C'_{100}$ | 1110 | |
| 100' sum correction factor | | | | | | 0000 | |
| Sum (unit 75) | | | | | | 1110 | |
| Proximity setting (0.3K) | | | | | | 0011 | 0 $C_o$ |
| Proximity carry | | | | | 1 $C_p$ | 0001 | |

Results: $C_e=0$; $C_D=0=C_o$; $C_p \cdot \Sigma_{12} \cdot \Sigma_{11} \cdot \Sigma_{10} \cdot \Sigma_9 \cdot \Sigma_8 \cdot \Sigma_7 \cdot \Sigma_6 \cdot \Sigma_5 = 1$. ∴ Indicated altitude < command altitude; ∴ Climb (below the Flight Corridor); ∴ Confirm (in the lower approach Corridor).

It should be pointed out that the application of the alerting system to an altitude problem is just one use of the system. Generally speaking, the alerting system is a general-purpose digital comparator with variable tolerance settings having LOW, GO or HIGH OUTPUT signals. With a proper choice of units, the alerting system can be adapted to other problems such as the accurate positioning of a control rod in a nuclear reactor, a car in a highway lane, or a ship in a channel, or any appropriate system where the control loop is not completely "closed," that is, where a human being, for instance, must make corrections based on data gathered from a display. The only difference in these applications is the nature of the data gathering and encoding device which feeds the alerting system logic. Actual implementation of the system can be done with NAND and NOR gates instead of AND and OR gates. Conversions from AND/OR arrangements to equivalent NAND/NOR systems are believed to be well within the ordinary level of skill in the logic design art. The details of alternate arrangements with equivalent logic are therefore omitted.

Instead of thumbwheel switches to set in the control variables, it would be a possible alternative to have remote programming of the corridor parameters. For example, the command altitude could be changed by radio from the ground by a central computer responsive to various changes in air traffic patterns. In addition, instead of providing a mutually exclusive proximity zone on either side of the flight corridor it would be possible to have overlapping zones by referencing the proximity setting directly to the command altitude instead of adding it to the two's complement of the deviation setting as in the embodiment described herein. Another alternative is that the command altitude parameters can be fixed via hard-wiring to provide optimal settings for different types of aircraft. For example, the deviation and proximity zones could be hard-wired leaving the command altitude settable by means of a thumbwheel switch.

Several aspects of the logic implementation must be emphasized for their simplicity. For example, the three basic subtraction operations utilize the two's complement form. The value of the difference in BCD form never needs to be generated, however. In each case only the carry from the most significant bit is determinative since in two's complement form this determines the sign of the difference indicating whether the minuend is smaller or larger than the subtrahend. In addition, the simple manner in which the outputs of deviation and proximity setting units 48 and 73 are manipulated allows a great reduction in the size of the logic.

One of the important advantages gained by this apparatus is plicity. Once the pilot sets in the assigned or command altitude and the desired proximity and deviation ranges, the operation of the altitude altering display is completely automatic until the pilot selects new parameters. Since the altering system interfaces with existing digital altitude encoders currently being incorporated in aircraft, the invention facilitates an integral altitude advisory/altering system without degrading the basic altimetry system.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An airborne high speed altitude alerting system for rapidly substantially simultaneously indicating the relationships of a digital input signal to a digital reference level and to a permissible digital deviation therefrom in either direction defining a corridor centered on the reference level, comprising:

first and second digital selector means for selecting respectively a predetermined reference level and a predetermined permissible deviation and providing respective outputs indicative thereof;

first digital comparator means adapted to receive the input signal and connected to receive said first selector means output for providing a binary sign output indicative of the greater thereof and a difference output indicative of the magnitude of the difference between the input signal and said first selector means output;

second digital comparator means connected to receive said second selector means output and said first comparator means difference output for providing a binary sign output indicative of the greater thereof concurrently with provision of said output of said first digital comparator; and first logic means responsive to said first and second comparator means sign outputs for substantially simultaneously providing respective output signals indicative of whether the input signal is above, below or within the corridor.

2. An alerting system according to claim 1 further comprising:

said first selector means output being in a complement form; and said first comparator means including binary adder means adapted to receive the input signal and first selector means output for addition thereof to provide said sign output as the most significant carry of said adder means and said difference output in complement form.

3. An alerting system according to claim 2 wherein:
said first selector means output and said first comparator means difference output are in two's complement form.

4. An alerting system according to claim 3 further comprising:
said second selector means connected to receive said first comparator means sign output for providing said second selector means output in true form when said first comparator means sign output is in one state and in complement form when said first comparator means output is in the other state; and
said second comparator means including adding means connected to receive said first comparator means difference output for addition thereof to provide said second comparator means sign output as the most significant carry of said second comparator means adder means.

5. An alerting system according to claim 4 further comprising:
said first comparator means sign output being in the high state when the input signal is greater than said first selector means output;
said second selector means providing the complement form of said output in response to a high said first comparator means sign output; and
said first logic means including first, second and third gate means each operatively connected to receive said first and second comparator means sign outputs, said first gate means providing a decrease signal indicative of coincidence of high first and second comparator means sign outputs, said second gate means providing a confirm signal indicative of a high condition for only one of said first and second comparator means sign outputs, and said third gate means providing an increase signal indicative of coincidence of low first and second comparator means sign outputs.

6. An alerting system according to claim 1 further comprising:
third digital selector means for selecting a predetermined proximity range on both sides of said corridor and providing an output indicative thereof;
said second comparator means further providing a difference output indicative of the magnitude of the difference between said first comparator means difference output and said second selector means output;
third comparator means connected to receive said second comparator means difference output and said third selector means output for producing a binary sign output indicative of the greater thereof; and
second logic means responsive to said third comparator means sign output for providing a proximity output signal indicative of whether the input signal is adjacent said corridor and within said proximity range substantially simultaneously with provision of said other output signals.

7. An alerting system according to claim 4 further comprising:
third digital selector means for establishing a proximity range on both sides of said corridor and providing an output indicative thereof, said third digital selector means output being in true form when said first comparator means sign output is in one state and in complement form when said first comparator means sign output is in the other state;
third comparator means including binary adder means operatively connected to receive said second comparator means difference output and said third selector means output for producing a binary sign output indicative of the greater thereof; and
second logic means responsive to said third comparator means sign output for providing a proximity output signal indicative of whether the input signal is adjacent said corridor and within said proximity range.

8. An airborne high speed altitude alerting system for rapidly substantially simultaneously indicating (1) the level of a BCD input signal relative to a selected predetermined reference level, (2) a permissible deviation therefrom in either direction defining a corridor, and (3) a proximity range immediately above and below the corridor, comprising:
first digital selector means for selecting the predetermined reference level and providing a BCD output in complement form indicative thereof and representing three decimal digits;
first binary full parallel adder means adapted to receive the input signal and connected to receive said first selector means output for providing a binary sign output indicative of the greater thereof as a most significant carry, and a sum output, and including means for adding a binary "one" to said sum output for conversion thereof to binary two's complement form;
first compensator means connected to receive said first adder means sum output for correction thereof to provide a valid BCD output;
second digital selector means connected to receive said first adder means sign output for determining the permissible deviation from the reference level to define the corridor and providing a BCD output indicative thereof representing two decimal digits, said second selector means output being in true form when said first adder means sign output is in one state and in complement form when said first adder means sign output is in the other state;
second binary full parallel adder means connected to receive said first compensator means output, said second selector means output and said first adder means sign output for adding said first adder means sign output to each bit of a portion of said first compensator means output representing a most significant decimal digit and for adding a corresponding portion of said first compensator means output to said second selector means output to provide a sign output as a most significant carry indicative of whether said first compensator means output is greater than said second selector means output; and
first logic means including first, second and third gate means each operatively connected to receive substantially simultaneously said first and second adder means sign outputs, said first gate means providing without appreciable delay a decrease signal indicative of coincidence of first and second adder means sign outputs in one state, said second gate means providing, without appreciable delay, a confirm signal indicative of said first and second adder means sign outputs having opposite states, and said third gate means providing, without appreciable delay, an increase signal indicative of coincidence of said first and second adder means outputs in the other state said signals being provided substantially simultaneously.

9. An alerting system according to claim 8 further comprising:
said second adder means further providing a sum output;
second compensator means connected to receive a portion of said second adder means sum output representing a least significant decimal digit for correction thereof to yield a valid BCD output;
third digital selection means connected to receive said first adder means sign output for determining a proximity range immediately above and below the corridor and providing a BCD output indicative thereof representing a decimal digit, said third selector means output being in true form when said first adder means sign output is in one state and in complement form when said first adder means sign output is in the other state;
third binary full adder means connected to receive said second compensator means output and said third selector means output for providing a sign output indicative of the greater thereof; and
second logic means including a pair of gate means each operatively connected to receive said third adder means sign output and a portion of said second adder means output excluding said portion representing said least significant decimal digit, one of said gate means providing an output indicative of coincidence of one state for said third adder means sign output and said portion of said second adder means output and the other said gate means providing an output indicative of coincidence of the other state for said third adder means sign output and said portion of said second adder means sum output, said second logic means further including OR means operatively receiving said pair of gate means outputs for providing a proximity output signal when either thereof is in one state.

10. An alerting system according to claim 9 further including:

third logic means including OR means operatively receiving said first logic means second gate means output and said second logic means OR means output for providing a composite confirm/proximity output signal when either thereof is in one state.

11. An alerting system according to claim 9 further comprising:

inhibit means adapted to receive a signal indicative of a negative value for the input signal and operatively connected to said first and second logic means for inhibiting said first logic means first and second gate means outputs and said second logic means OR means output and activating said first logic means third gate means increase output.

12. An alerting system according to claim 9 further comprising:

said first, second and third selector means being BCD thumbwheel switches.

* * * * *